Aug. 8, 1950
J. SCHURY
2,518,080
PLANER AND HEIGHT GAUGE
Filed July 13, 1944
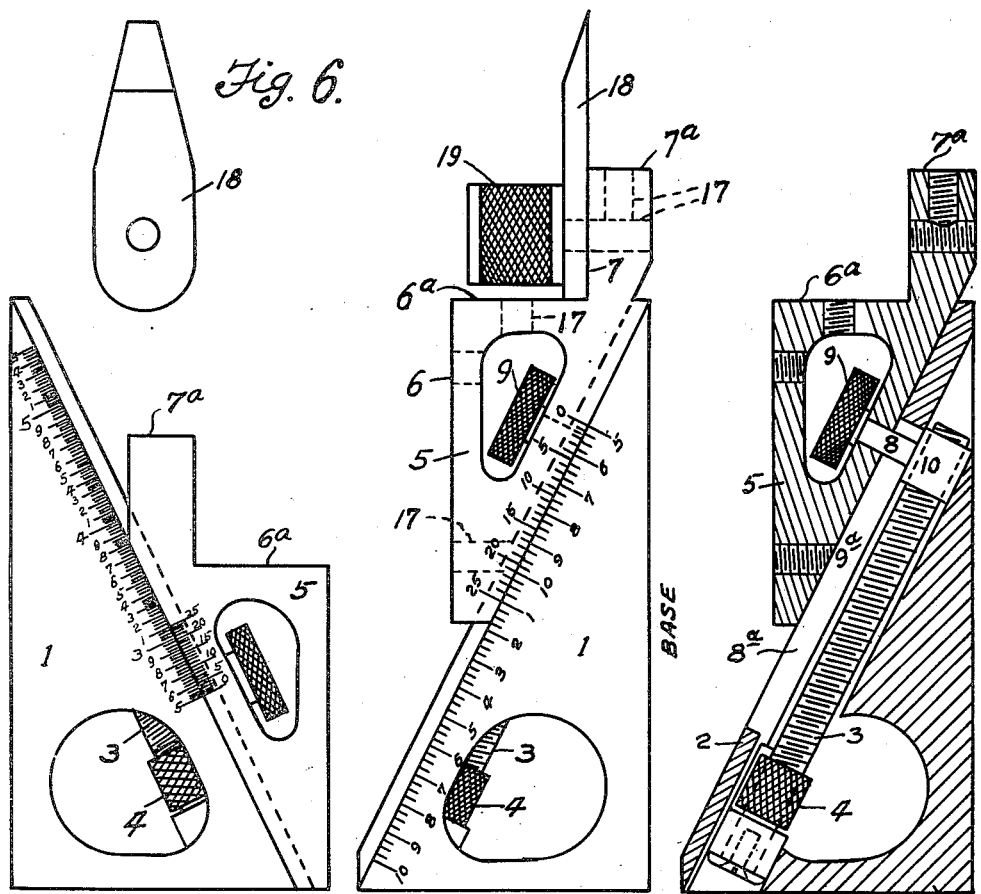
INVENTOR.
JOHN SCHURY.
BY
Charles E. Train Patented Aug. 8, 1950

2,518,080

UNITED STATES PATENT OFFICE 2,518,080

PLANER AND HEIGHT GAUGE

John Schury, Detroit, Mich.

Application July 13, 1944, Serial No. 544,758

4 Claims. (Cl. 33—162)

This invention relates to planer and height gauges and has for its object an improved gauge of this character including a base of right triangular form and a member slidable on the inclined face thereof with the opposed faces of the two parts having graduations for effecting a minute adjustment and avoiding the necessity of the use of a micrometer in adjusting the parts.

It has heretofore been known to utilize a triangular base and slidable member thereon with each of the parts not provided with a scale and a micrometer is required to be used between a surface of the movable part and the object relative to which the said part is to be accurately positioned.

By my improved gauge the necessity of the use of a micrometer in addition to the gauge is dispensed with thereby permitting a much quicker reading to be made and the adjustment more quickly effected.

These and other features and objects of the invention are hereinafter more fully described and claimed and the preferred form of a planer and height gauge embodying my invention is shown in the accompanying drawings in which:

Fig. 1 is an elevation showing one side of the gauge.

Fig. 2 shows the other side of the gauge.

Fig. 3 is a vertical section of the gauge showing the operating parts.

Fig. 4 is an end view of the base of the gauge.

Fig. 5 is a sectional elevation showing an alternative form of the invention including a means for releasing the slide to permit a quick and approximate adjustment thereof longitudinally of the inclined face of the base.

Fig. 6 shows a scriber used with the gauge.

The gauge according to my invention may be utilized for various purposes as for instance, adjusting the depth for the finish cut of the planer or in setting the tool for any required depth. A micrometer or height gauge device is necessary to set the gauges heretofore in use. My improved gauge does not require the use of a micrometer as a reading may be made on one side or the other of my improved gauge by means of the complemental graduations on the base and slide.

The graduations differ on the opposite sides of the gauge the necessity for which will be realized from the fact that if the side of member I marked "base" is in horizontal position, movement of the slide will be greater than is the case if the side marked "base" in Fig. 2 be used. Thus the graduations for the same variation in position of the slides differ and if the face 7 of the slide requires to be moved vertically one-fourth of an inch the slide will of necessity require to be moved more than one-fourth of an inch on the member I and it is further pointed out that graduations are of such character that a micrometer may be dispensed with in adjusting the slide as has heretofore been the common practice.

My improved gauge has a body I in the form of a right triangle the inclined face 2 of which has beveled edges 2a and 2b as shown in Fig. 4. The slide 5 has a longitudinal groove shaped to ride on the edges 2a and 2b of the body member I whereby lateral displacement of the slide relative to the base is prevented.

In the form of the invention shown in Figs. 1, 2 and 3 rotation of the screw 3 by the knob 4 in one direction or the other correspondingly varies the position of the slide 5 on the base. It has been the common practice heretofore to use a micrometer in determining the distance of a face of the slide, as for instance the faces 6, 6a, 7 or 7a, in respect to a tool in a planing or other machine whereby, for instance, the finished dimension of the work can be accurately determined. Such operation is dispensed with by use of my improved gauge.

This slide 5 has faces 6 and 6a and faces 7 and 7a at a right angle one to the other. The slide 5 has an aperture therein and the portion of the slide fitting the inclined surface 2 of the base has an aperture through which extends a stem 8 having a nut 9 on the end thereof located in the first named aperture of the slide as will be understood from Fig. 3. The opposite end of the stem 8 is secured to a tubular nut 10 in a manner to prevent rotation thereof. The stem 8 extends through a slot 8a in the inclined face of the base I.

In the gauge shown in Figs. 1, 2 and 3 the movement of the slide 5 is solely by rotation of the screw 3 by the adjusting nut 4. A rough adjustment of the slide may be more readily accomplished by the arrangement of parts shown in Fig. 5 in which the slide 5a is similar to the slide 5 shown in Figs. 2 and 3 and the base Ia is similar to the base I in Fig. 3.

The adjusting screw 3a of Fig. 5 is not threaded in the sleeve 3b but the sleeve is slidable thereon. There is a clamping and release nut 13 threaded on the stem 3c secured to the sleeve 3b. The nut 13 has a cylindrical recess 15 in its periphery in which an end portion of the release bar 16 engages. This bar is reciprocable in an aperture provided in the base of the slide 5a and the lower end enters an opening in the sleeve 3b and is threaded at its end to engage the threads of the screw 3a. When the parts are in the relationship shown in Fig. 5 rotation of the screw 3a moves the slide to adjust the same as is the case in the form shown in Figs. 1, 2 and 3.

However, when it is desired to move the slide to approximately adjust the same, the clamp and release nut 13 is rotated in a direction to withdraw the threaded end of the release bar 16 from engagement with the threads of the screw 3a thereby permitting the slide to be moved manually on the base to approximately a desired position. The nut 13 is then rotated in a reverse direction to permit the release bar 16 to engage the threads of the screw and thereafter rotation of the screw 3a permits a fine adjustment of the position of the slide.

The release bar has a shoulder 16a and is further provided with a spring 7 (here shown as a coiled spring) tending to cause engagement of the threaded end of the bar 16 with the threads of the screw 3a. The shoulder 16a engages in the groove 15 in the periphery of the nut 13 whereby, on rotation of the nut, the release bar 16 may be withdrawn from engagement with the screw 3a to provide for quick adjustment of the slide 5a.

The form of the invention shown in Fig. 5 is somewhat more expensive to manufacture than the form shown in Fig. 1 but is more desirable in use in that a workman requires less time to adjust the slide over any considerable portion of its possible movement. The faces 6, 6a, 7 and 7a of the slide shown in Fig. 1 and similar faces of the slide 5a shown in Fig. 5 may have threaded apertures 17 utilized to secure a scriber 18 to either of the faces having a threaded aperture for a test block 19 or other instrumentality that may be desired to be utilized in conjunction with the slide in locating a tool or the work respectively one to the other.

It is believed evident from the foregoing description that my improved planer and height gauge is of simple form and construction and, in respect to prior gauges of this type within my knowledge, is more readily adjusted to an exact position than previous gauges of this type known to me particularly in the making of a quick adjustment to approximately position the slide and to thereafter adjust the slide to an exact position without necessity of the use of a micrometer as has heretofore been the practice.

It is further pointed out that various changes may be made in the device as shown in the accompanying drawings without departing from the spirit and scope of the invention as set forth in the appended claims.

Having thus briefly described my invention, its utility and mode of operation, what I claim and desire to secure by Letters Patent of the United States is:

1. A gauge comprising a base having the form of a right triangle, the inclined face of which is provided with a longitudinal slot, a slide having a face engaging the inclined face of said base, a rotatable screw supported by the base with its axis parallel with the inclined face thereof, a sleeve loosely engaging said screw, a stem secured at one end to said sleeve and extending through said longitudinal slot and supported by said slide, being threaded at its outer end, a bar reciprocably supported in an aperture provided in the slide and having a threaded end operatively engaging the threads of said screw, and a nut adjustably mounted upon the outer end of said stem loosely and retainingly engaging said bar whereby the bar may be released from engagement with the screw to permit free movement of the slide on the base and of the sleeve upon the screw.

2. A gauge comprising a base having the form of a right triangle, the inclined face of which is provided with a longitudinal slot, a slide having a face engaging the inclined face of said base, a rotatable screw supported by the base with its axis parallel with the inclined face thereof, a sleeve loosely engaging said screw, a stem secured at one end to said sleeve and extending through said longitudinal slot and supported by said slide, being threaded at its outer end, a bar reciprocally supported in an aperture provided in the slide and having a threaded end operatively engaging the threads of said screw, a spring on said bar tending to hold its threaded end in engagement with the screw threads, and a nut adjustably mounted upon the outer end of said stem loosely and retainingly engaging said bar whereby the bar may be released from engagement with the screw to permit free movement of the slide on the base and of the sleeve upon the screw.

3. A gauge comprising a base having the form of a right triangle, the inclined face of which is provided with a longitudinal slot, a slide having a face engaging the inclined face of said base, a rotatable screw supported by the base with its axis parallel with the inclined face thereof, a sleeve loosely engaging said screw, a stem secured at one end to said sleeve and extending through said longitudinal slot and supported by said slide, being threaded at its outer end, a bar reciprocally supported in an aperture provided in the slide and having a threaded end operatively engaging the threads of said screw, and a nut adjustably mounted upon the outer end of said stem, and having an annular recess therein, said bar having a lateral projection slidably and retainingly engaged within said annular recess whereby upon rotation of said nut the bar may be withdrawn from engagement with the screw to permit free movement of the slide upon the base.

4. A gauge comprising a base having the form of a right triangle, the inclined face of which is provided with a longitudinal slot, a slide having a face engaging the inclined face of said base, a rotatable screw supported by the base with its axis parallel with the inclined face thereof, a sleeve loosely engaging said screw and having a transverse slot extending through the upper portion thereof, a stem secured at one end to said sleeve and extending through said longitudinal slot and supported by said slide, being threaded at its outer end, a bar reciprocally supported in an aperture provided in the slide extending through said longitudinal slot and having a threaded end retainingly positioned through said sleeve slot and operatively engaging the threads of said screw, and a nut adjustably mounted upon the outer end of said stem loosely and retainingly engaging said bar whereby upon rotation of said nut said bar may be withdrawn from operative engagement with said screw to permit free movement of the slide on the base.

JOHN SCHURY.

REFERENCES CITED

The following references are of record in the file of this patent:

UNITED STATES PATENTS

| Number | Name | Date |
|---|---|---|
| 1,228,791 | Laubscher | June 5, 1917 |
| 2,219,180 | Fichter | Oct. 22, 1940 |
| 2,242,116 | Donaway | May 13, 1941 |
| 2,330,412 | Dierking | Sept. 28, 1943 |
| 2,353,886 | Findley et al. | July 18, 1944 |
| 2,372,368 | Dierking | Mar. 27, 1945 |